(12) United States Patent
Lum et al.

(10) Patent No.: US 7,471,014 B2
(45) Date of Patent: Dec. 30, 2008

(54) METHOD AND APPARATUS DISTRIBUTING POWER TO A LOAD IN A POWERED DEVICE

(75) Inventors: Meilissa R. Lum, San Jose, CA (US); Kan-Chiu Seto, Saratoga, CA (US); Roger Karam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 12 days.

(21) Appl. No.: 11/514,606

(22) Filed: Sep. 1, 2006

(65) Prior Publication Data

US 2008/0054720 A1  Mar. 6, 2008

(51) Int. Cl.
  *H02J 3/00* (2006.01)
(52) U.S. Cl. .......................................... 307/83; 307/82
(58) Field of Classification Search ................... 307/82, 307/83
  See application file for complete search history.

(56) References Cited

U.S. PATENT DOCUMENTS

| | | | | |
|---|---|---|---|---|
| 5,428,524 A | * | 6/1995 | Massie | 363/79 |
| 6,650,028 B1 | * | 11/2003 | Cornelius | 307/87 |
| 6,650,622 B1 | | 11/2003 | Austerman, III et al. | 370/241 |
| 6,833,635 B2 | * | 12/2004 | Kippley | 307/83 |
| 7,053,501 B1 | | 5/2006 | Barrass | 307/19 |
| 7,054,779 B2 | | 5/2006 | Rakshani et al. | 702/117 |
| 2006/0163949 A1 | * | 7/2006 | Barrass | 307/19 |

OTHER PUBLICATIONS

Herbold, Jacob. "Navigating the IEEE 802.3af Standard for PoE", Power Electronics Technology, Jun. 1, 2004. (http://powerelectronics.com/mag/power_navigating_ieee_af/, visited Oct. 31, 2007).*
Rosales, Jesus: "Power over Ethernet Isolated Power Supply Delivers 11.5W at 90% Efficiency"—Design Note 338, Linear Technology Corporation advertisement, 2004, 2 pages.

* cited by examiner

*Primary Examiner*—Stephen W Jackson
*Assistant Examiner*—Hal I Kaplan
(74) *Attorney, Agent, or Firm*—BainwoodHuang

(57) ABSTRACT

A powered device, such as an IP telephone, includes power converter electronics that allows the powered device to couple to multiple power sources and receive a relatively large amount of power (e.g., 15 W or greater) from any single power source or from any combination of the power sources. For example, the powered device can connect to a first power source and a second power source by a cable having four twisted pairs of conductors where a first two-pair set of conductors couples the powered device to the first power source and a second two-pair set of conductors couples the powered device to the second powered device. In use, the converter circuitry can provide power to the load from either the first power source via the first two-pair set of conductors, the second power source via the second two-pair set of conductors, or from both power sources via both the first and second two-pair sets of conductors.

16 Claims, 7 Drawing Sheets

METHOD AND APPARATUS DISTRIBUTING POWER TO A LOAD IN A POWERED DEVICE

BACKGROUND

Conventional networks typically include data communications devices that transmit data packets from one or more sources to one or more destinations. Data communications devices, such as routers, receive packets containing data and control information at input ports, and, based on destination or other information included in the packets, route the packets to appropriate output ports that lead to either another router or to the packet's final destination. Certain networks, such as Voice Over Internet Protocol (VOIP) networks, include multiple powered devices such as Internet-Protocol telephones (IP telephones) connected by one or more routers. These VOIP networks allow the IP telephones to send and receive audio, video, data, and other signals as Internet-Protocol signals.

The VOIP network can provide power to the IP telephones using a power source, such as a Power over Ethernet (PoE) device. For example, IP telephones typically connect to a router using RJ-45 connectors having four pairs of twisted pair conductors used to transmit data. In the VOIP networks, the router and IP telephones exchange data using two of the four pairs of conductors and the PoE device may inject power between the router and the IP telephones and transmits the power over the remaining two of the four pairs of conductors.

In use, the power source transmits a particular amount of power to a powered device, such as an IP telephone, based upon the power classification of the powered device as defined by the IEEE 802.3af standard. In one arrangement, IP telephones, such as IP telephones models 7960G, 7961G, 7970G, or 7971G-GE manufactured by Cisco Systems, Inc. of San Jose, Calif., each receive a particular amount of power from the PoE device during operation based upon the power classification of the telephone. For example, conventional IP telephones require up to 12 Watts (W) of power to operate. As a result, PoE devices are operable to deliver up to 12 W of power to a corresponding IP telephone.

SUMMARY

As IP telephones and other powered devices are developed to include additional features or functions, it is foreseeable that these devices will require more than 12 W of power to operate. With such larger power requirements, the VOIP network will be required to deliver additional power to the IP telephones. Such power delivery can be accomplished in a variety of ways.

One power delivery option involves the use of a single PoE device, such as a switch or a midspan device, to transmit a relatively large amount of power to the powered device using two of the four pairs of conductors of the conventional RJ-45 connectors. However, such a power delivery option has certain deficiencies. For example, assume the PoE device transmits 30 W to an IP telephone over two of the pairs of the twisted pair conductors. With such power transmission, the amount of current that the two pairs of conductors carry is relatively larger than the amount carried during transmission of 12 W. Since the power loss in the conductors is governed by the relationship $P=I^2*R$, with an increase in the current through the conductors, a larger amount of heat is generated in the cable. As such, the two pairs of conductors may not be able to sufficiently dissipate the heat which, in turn, can lead to malfunction.

Another option involves the use of four pairs of conductors to deliver power to a powered device. However, with such delivery, there may be a mismatch in the DC resistance of the pairs that, in turn, may cause an imbalance of current to flow between one set of pairs versus the other. If the imbalance were to become high enough, the imbalance may cause a current limit on one set of pairs to inadvertently shut down a power source's port power.

By contrast to conventional powered devices, embodiments of the invention are directed to a method and apparatus for distributing power to a load in a powered device. A powered device, such as an IP telephone, includes power converter electronics that allows the powered device to couple to multiple power sources and receive a relatively large amount of power (e.g., 15 W or greater) from any single power source or from any combination of the power sources. For example, the powered device can connect to a first power source and a second power source by a cable having four twisted pairs of conductors where a first two-pair set of conductors couples the powered device to the first power source and a second two-pair set of conductors couples the powered device to the second powered device. In use, the converter circuitry can provide power to the load from either the first power source via the first two-pair set of conductors, the second power source via the second two-pair set of conductors, or from both power sources via both the first and second two-pair sets of conductors. When providing power to the load from both the first and second two-pair sets of conductors, the power converter electronics can alternate the power transferred from each of the first and second power sources to provide a relatively large amount of power to the load. When providing power to the load from either the first or the second two-pair sets of conductors, a current limit of the power converter electronics is increased in order to provide an increased amount of power to the powered device load. Such an arrangement allows the powered device to receive a relatively larger amount of power from one or more power sources in order to operate.

In one embodiment, a powered device is operable to receive power via a communication medium. The powered device includes first interface electronics operable to receive power from a first power source and a second interface electronics operable to receive power from a second power source. The powered device also includes power converter electronics having first primary windings electrically coupled to the first interface electronics, second primary windings electrically coupled to the second interface electronics, and a secondary windings electrically coupled to the first primary windings and to the second primary windings. The powered device also includes a load electrically coupled to the secondary windings where the power converter electronics are operable to provide power from at least one of the first interface electronics and the second interface electronics to the load.

Another embodiment relates to a method for providing power to a powered device load. In the method, first interface electronics is coupled to a first power source where the first interface electronics electrically couples to first primary windings and secondary windings. Also in the method, a second interface electronics is coupled to a second power source where the second interface electronics is electrically coupled to second primary windings and the secondary windings. Also in the method, power is provided from at least one of the first power source and the second power source to the powered device load electrically coupled to the secondary windings by at least one of the first primary windings and the second primary windings.

In another embodiment, a data communications system includes a first power source, a second power source, and a powered device having first interface electronics electrically coupled to the first power source and second interface electronics electrically coupled to the second power source. The powered device also include power converter electronics having first primary windings electrically coupled to the first interface electronics, second primary windings electrically coupled to the second interface electronics, and secondary windings electrically coupled to the first primary windings and to the second primary windings. The powered device also includes a load electrically coupled to the secondary windings. The power converter electronics are operable to provide power from at least one of the first power source and the second power source to the load.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to a method and apparatus for distributing power to a load in a powered device. A powered device, such as an IP telephone, includes power converter electronics that allows the powered device to couple to multiple power sources and receive a relatively large amount of power (e.g., 15 W or greater) from any single power source or from any combination of power sources. For example, the powered device can connect to a first power source and a second power source by a cable having four twisted pairs of conductors where a first two-pair set of conductors couples the powered device to the first power source and a second two-pair set of conductors couples the powered device to the second powered device. In use, the converter circuitry can provide power to the load from either the first power source via the first two-pair set of conductors, the second power source via the second two-pair set of conductors, or from both power sources via both the first and second two-pair sets of conductors. When providing power to the load from both the first and second two-pair sets of conductors, the power converter electronics can alternate the power transferred from each of the first and second power sources to provide a relatively large amount of power to the load. When providing power to the load from either the first or the second two-pair sets of conductors, a current limit of the power converter electronics is increased in order to provide an increased amount of power to the powered device load. Such an arrangement allows the powered device to receive a relatively larger amount of power from one or more power sources in order to operate.

Figure 1:
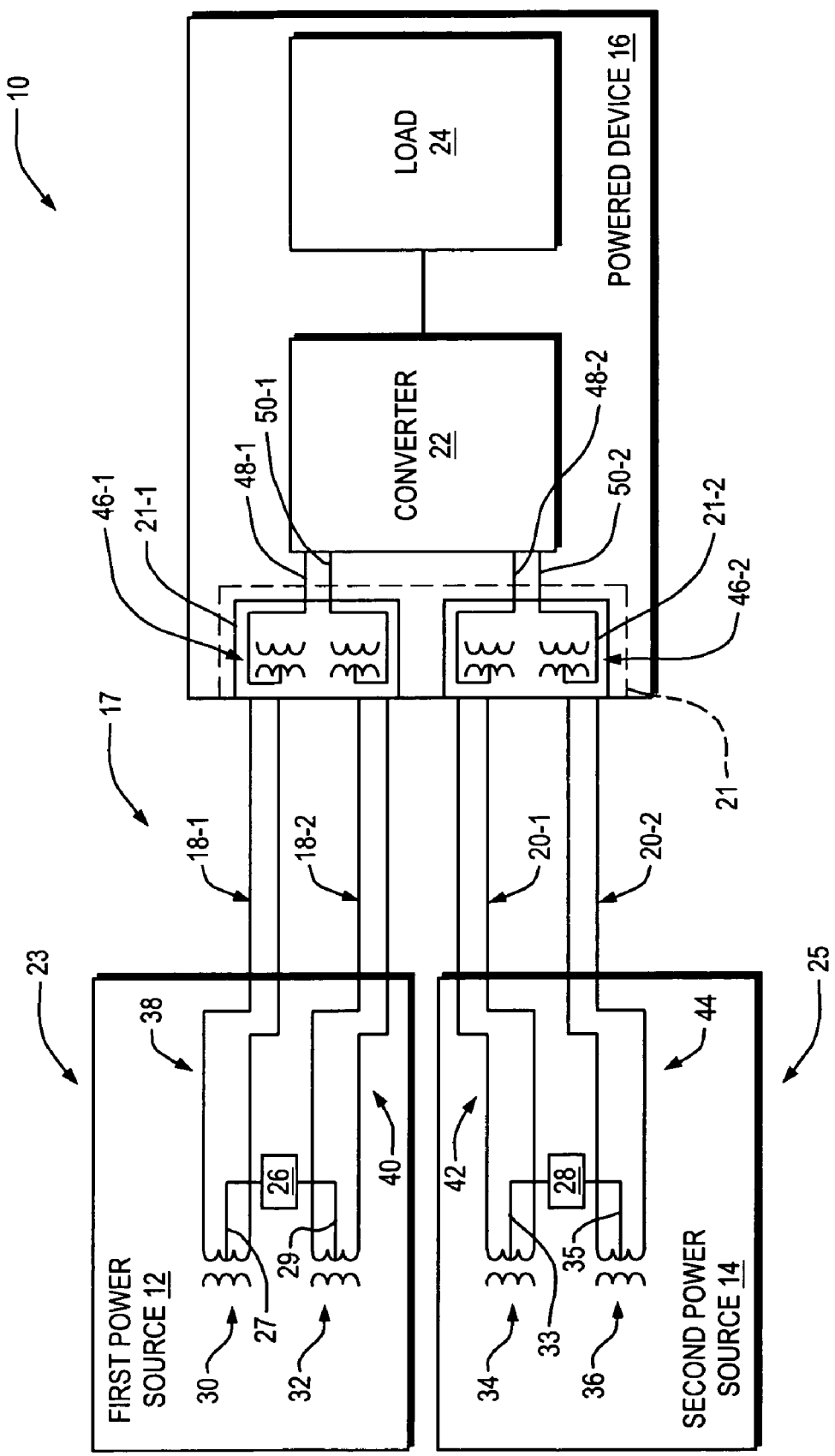
FIG. 1 illustrates a block diagram of a data communications network, according to one embodiment of the invention.

FIG. 1 illustrates a block diagram of a data communications system 10, according to one embodiment of the invention. As illustrated, the system 10 includes a first power source 12 and a second power source 14 electrically coupled to a powered device 16 by a cable 17. The system 10 can be configured as a Voice Over Internet Protocol (VOIP) network that allows the powered device 16, such as an IP telephone, to send and receive audio, video, and other data signals as Internet-Protocol signals. The VOIP network 10 can also provide power to the powered device 16 from the first and second power sources 12, 14. In one arrangement of the system 10, the first power source 12 and the second power source 14 form part of a single router, switch, or hub where the cable 17 electrically couples the first and second power sources 12, 14 to the powered device 16. In another arrangement the first power source 12 can be configured as power sourcing equipment (PSE), such as a router, switch, or hub, to exchange both data signals and power signals with the powered device 16 while the second powered device can be configured as a midspan device to transmit power signals to the powered device 16. In such an arrangement, the PSE electrically couples to the midspan device and the cable 17, while physically coupled to the midspan device, is configured to transmit power between both the PSE and the powered device 16 and midspan device and the powered device.

The first and second power sources 12, 14 can include power generation electronics 23, 25 that produce power for transmission to the powered device 16. For example, as illustrated, the first power source 12 includes a power controller 26 electrically coupled to first and second center taps 27, 29 of corresponding data transformers 30, 32. Also as illustrated, the second power source 14 includes a power controller 28 electrically coupled to first and second center taps 33, 35 of corresponding data transformers 34, 36. In the first power source 12, the power controller 26 applies power across the first and second center taps 27, 29 of the transformers 30, 32, thereby causing positive power to flow on transmit conductors 38 of the transformer 30 and causing negative or return power to flow on receive conductors 40 of the transformer 32. Additionally, in the second power source 14, the power controller 28 applies power across the first and second center taps 33, 35 of the transformers 34, 36, thereby causing positive power to flow on transmit conductors 42 of the transformer 34 and causing negative power to flow on receive conductors 44 of the transformer 36.

The first and second power sources 12, 14 each connect to the powered device 16 via the multiple-conductor-pair cable 17, such as a Category 5/6 unshielded twisted pair cable commonly used for Ethernet communications, to provide both data and power signals to the powered device 16 via the cable 17. The cable 17 includes four sets of twisted pair conductors. For example, the cable 17 includes a first set of twisted pair conductors 18-1 configured to carry positive power from the first power source 12 to the powered device 16 and a second set of twisted pair conductors 18-2 configured to carry negative or return power from the powered device 16 to the first power source 12. The cable 17 can also include a third set of twisted pair conductors 20-1 configured to carry positive power from the second power source 14 to the powered device 16 and a fourth set of twisted pair conductors 20-2 configured to carry negative or return power from the powered device 16 to the second power source 14. The cable 17 also includes two additional sets of twisted pair conductors, not shown, operable to provide data signals to the powered device 16 if the second power source 14 was in the same Ethernet system as the first power source 12.

The powered device 16, such as an IP telephone, includes a connector 21 having first and second interface electronics 21-1, 21-2, power converter electronics 22, and a load 24. The first and second interface electronics 21-1 and 21-2 are operable to receive power from the first and second power sources 12, 14, respectively, via the multiple-conductor-pair cable 17. In one arrangement, the first and second interface electronics 21-2, 21-2 include magnetic elements operable to receive power from the power sources 12, 14 and distribute the power to the power converter electronics 22. Taking the interface electronics 21-1 as an example, the interface electronics 21-1 includes data transformers 46-1, 46-2 where the first transformer 46-1 is operable to receive positive power via the first set of twisted pair conductors 18-1 and deliver the positive power to the converter 22 by a center tap conductor 48-1. Furthermore, the second transformer 46-2 is operable to receive negative power from the power converter electronics 22 by a center tap conductor 50-1 and deliver the negative or return power to the first power source 12 via the second set of twisted pair conductors 18-2. The power converter electronics 22 are configured to receive power from the first and second power sources 12, 14 and provide the power from either one or both of the power sources 12, 14 to the load 24. The load 24 includes powered elements associated with the powered device 16 that require some amount of power for operation. For example, the load 24 can include a display screen, a speaker, a status light, or a voice transducer or microphone.

Figure 2:
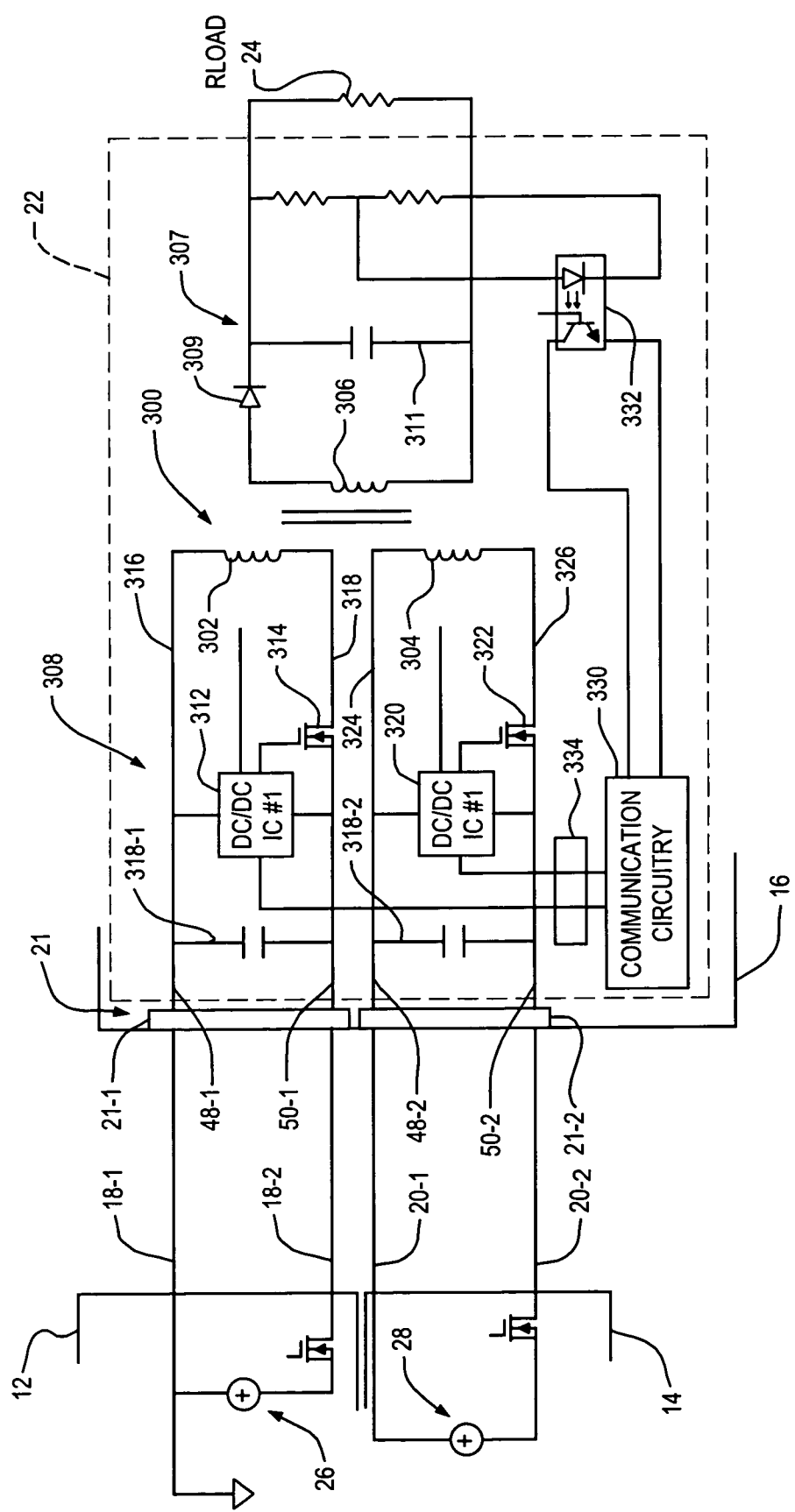
FIG. 2 illustrates a more detailed schematic-block diagram combination of the data communications network of FIG. 1, according to one embodiment of the invention.

While the power converter electronics 22 can have a variety of configurations to provide power to the load 24, FIG. 2 illustrates one embodiment of the power converter electronics 22 of the powered device 16.

As illustrated in FIG. 2, the power converter electronics 22 includes first and second controller circuits 308, 310 and a transformer 300 having first primary windings 302, second primary windings 304, and secondary windings 306 electrically coupled to both the first primary windings 302 and to the second primary windings 304. The power converter electronics 22 also includes a half-wave rectifier 307 electrically coupled to the secondary windings 306 and to the load 24. Collectively, the first and second controllers 308, 310, the transformer 300, and the half-wave rectifier 307 form a DC-to-DC converter.

The first controller circuit 308 is electrically coupled between the first interface electronics 21-1 and the first primary windings 302 and is operable to control the transfer of power from the first primary windings 302 to the secondary windings 306. In one arrangement, the first controller circuit 308 includes a first controller 312, such as a pulse width modulation integrated circuit (PWMIC), a current limit circuit, and/or other management and control circuitry, and a first MOSFET transistor 314 electrically coupled to the first controller 312. The first controller 312 electrically couples first and second conductors 316, 318 of the first primary windings 302 to the center tap conductors 48-1, 50-1 of the first interface electronics 21-1, respectively.

The second controller circuit 320 is electrically coupled between the second interface electronics 21-2 and the second primary windings 304 and is operable to control the transfer of power from the second primary windings 304 to the secondary windings 306. In one arrangement, the second controller circuit 310 includes a second controller 320, such as a PWMIC, a current limit circuit, and/or other management and control circuitry, and a second MOSFET transistor 322 electrically coupled to the second controller 320. The second controller 312 electrically couple first and second conductors 324, 326 of the second primary windings 304 to the center tap conductors 48-2, 50-2 of the second interface electronics 21-2, respectively.

The power converter electronics 22 can be configured to deliver power to the load 24 in one of two modes of operation. In one arrangement, in a first mode of operation termed "4-pair mode", both of the first and second power sources 12, 14 actively supply power to the powered device 16 via all four twisted pairs 18-1, 18-2, 20-1, 20-2 of the cable 17. In 4-pair mode, the power converter electronics 22 are configured to alternate power delivery between both the first power source 12 and the second power source 14 to the load 24 to provide the powered device 16 with the maximum amount of power required for operation. Additionally, the power converter electronics 22 can be configured to deliver power to the load 24 using a second mode of operation, termed "2-pair mode." In 2-pair mode, one of either the first and second power sources 12, 14 provides power to the powered device 16 via its corresponding twisted pair conductors 18-1 and 18-2 or 20-1 and 20-2, respectively.

For example, in 4-pair mode, the powered device 16 receives power from the first power source 12 via the first interface electronics 21-1 and receives power from the second power source 14 via the second interface electronics 21-2. As such, power builds in the first and second primary sets of windings 302, 304. In use, the first and second controllers 312, 320 actuate the corresponding MOSFETs 314, 322 in an alternating manner to cause the first and second primary of windings 302, 304 to discharge or pulse power thereby causing the secondary windings 306 to receive power in an alternating manner. In such a configuration, the first and second primary windings 302, 304 do not substantially transfer power to the secondary windings 306 at the same time.

Figure 3:
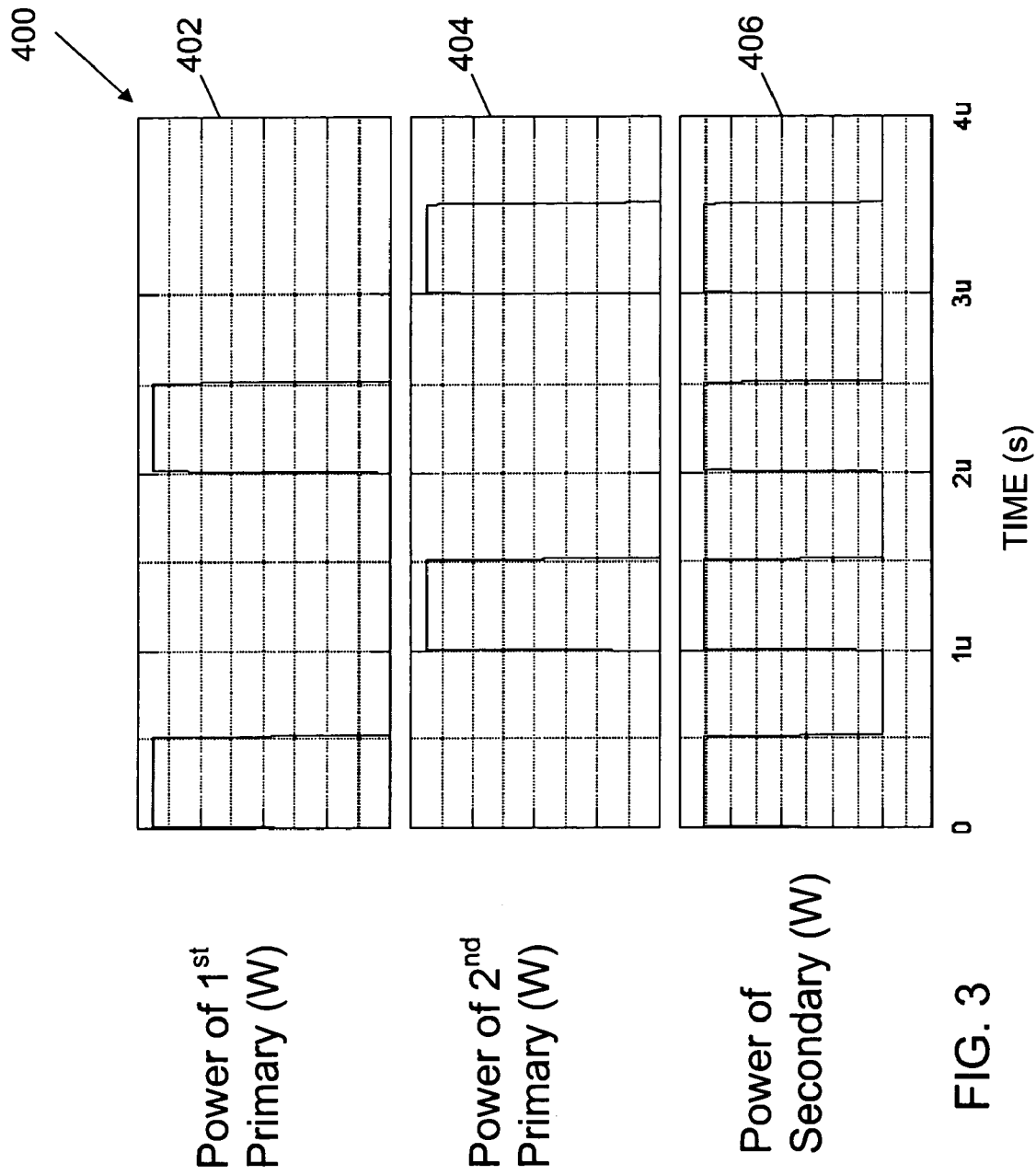
FIG. 3 is a graph illustrating power transfer among first primary windings, second primary windings, and secondary windings of power converter electronics of FIG. 2, according to one embodiment of the invention.

FIG. 3 shows several charts 400 that illustrate an example of the alternating nature of the power delivery performed by the first and second primary sets of windings 302, 304 and the resultant power received by the secondary windings 306. In the example, the transformer 300 operates at a 500 kHz frequency (e.g., where the period is 2 uS) and a 25% duty cycle. As shown in the first graph 402, the first primary windings 302 transfers 15 W of power to the secondary windings 306 during the first half of the cycle, from between 0 us to about 0.5 uS. As indicated in the second graph 404, the second primary windings 304 transfers 15 W of power to the secondary windings 306 during the second half of the cycle, from between about 1 uS to 1.5 uS, approximately 180 degrees out of phase from the power delivery of the first primary windings 302. As illustrated in the third graph 406, the power pulse received by the secondary windings 306 is the combination of the power pulses transmitted by the first primary windings 302 and the second primary windings 306.

Returning to FIG. 2, as the secondary windings 306 receives the power pulses discharged from the first and second primary sets of windings 302, 304, the secondary sets of windings 306 transmit the power pulses to the half-wave rectifier 307, formed of a diode 309 and a capacitor 311. The amount of power discharged by the secondary windings 306 is the sum of the power pulses from the first and secondary windings 302, 306. For example, when the first and second sets of winding 302, 306 each provide 15 W of power to the secondary windings 306, the secondary 306 provides a total of 30 W to the half-wave rectifier 307. The half-wave rectifier 307 then converts the pulsed power to a DC power signal and provides the power to the load 24 of the powered device 16. In this arrangement, compared to conventional powered devices, the power converter electronics 22 allows the powered device 16 to utilize relatively larger power amounts (e.g., greater than approximately 12 W) and receive the relatively larger amounts of operating power over a communications medium from two separate power sources 12, 14.

As indicated above, the power converter electronics 22 delivers power from the first and second power sources 12, 14 to the load 24 in a switched manner. In this configuration, such delivery of power can potentially create noise on either cable 18, 20 or in the system 10. In one arrangement, the power converter electronics 22 include capacitors 318 operable to minimize or prevent noise within the system 10 as caused by the power switching performed by the power converter electronics 22. For example, the power converter electronics 22 can include a first capacitor 318-1 electrically coupled to the first interface electronics 21-1 and disposed between the first set 18-1 of twisted pair conductors and the second set 18-2 of twisted pair conductors, where the single line referenced by 18-1 and the single line referenced by 18-2 represents twisted pair conductors. The power converter electronics 22 can also include a second capacitor 318-2 electrically coupled to the second interface electronics 21-2 and disposed between the third set 20-1 of twisted pair conductors and the fourth set 20-2 of twisted pair conductors, where the single line referenced by 20-1 and the single line referenced by 20-2 represents twisted pair conductors. Series and parallel impedance elements can also be deployed to help reduce noise generated by the sets of twisted pair conductors 18-1, 18-2. For example, the impedance elements can include common mode chokes, ferrites, LC filters and the like.

As described above, the powered device 16 can receive power via a 4-pair mode of operation. Also as indicated above, in another arrangement, the powered device 16 can also receive power via a 2-pair mode of operation. In 2-pair mode, the power converter electronics 22 are configured to provide a relatively large amount of power (e.g., a power amount greater than approximately 12 W or a power amount greater than approximately 12 W and less than approximately 30 W) to the secondary windings 306 from either of the first and second power sources 12, 14 via either of the corresponding first or second primary sets of windings 302, 304. As such, the primary sets of windings 302, 304 are configured to carry a relatively large amount of power required for operation of the powered device 16 from a single power source.

For example, assume the case where the powered device 16 requires 30 W of power for operation. Further assume that the powered device 16 is electrically coupled only to the first power source 12. In such a case, the power converter electronics 22 operates in 2-pair mode to provide 30 W of power from the first primary windings 302 to the secondary windings 306. In order to provide such a transfer of power, the power converter electronics 22 are operable to increase a current limit associated with the primary side 302 of the transformer 300. For example, in order to provide 30 W of power to the load 24 in 2-pair mode, the current limit of the primary set of windings 302 can be two times greater than the current limit of the primary set of windings 302 when used in 4-pair mode. To allow the single primary 302 to transfer an increased amount of power, such as 30 W, to the secondary 306, the power converter electronics 22 can double the current limit of the first primary windings 302. In such a configuration, the powered device 16 can receive a relatively large amount from a single power source (e.g., one of the first and second power sources 12, 14) for operation.

As indicated above, in 4-pair mode, the powered device 16 receives power from the first power source 12 and from the second power source 14 via cable 17. However, when twisted pair conductors (e.g., the first and second sets of twisted pair conductors 18-1, 18-2 and the third and fourth sets of twisted pair conductors 20-1, 20-2) have mismatched DC path resistances, the mismatch can create an imbalance in the current carried by the conductors, which can lead to the first power source 12 and the second power source 14 delivering unequal amounts of power to the powered device. In one arrangement, the power converter electronics 22 are configured to detect and correct for such an imbalance in the DC path resistances of the conductors of the cable 17.

For example, as shown in FIG. 2, the powered device 16 includes communication circuitry 330 electrically coupled to each of the first and second controllers 312, 320. The communications circuitry 330 is configured to monitor the current drawn by the first and second primary winding 302, 304 through the corresponding first and second controllers 312, 320 and adjust the current drawn from each set of windings 302, 304 to ensure that the current drawn from each of the first and second power sources 12, 14 are within a particular tolerance. With such adjustment, the communications circuitry 330 can adjust for imbalances in the DC path resistances between the first and second sets of twisted pair conductors 18-1, 18-2 or between the third and fourth sets of twisted pair conductors 20-1, 20-2. Also, if the power source 26 and the power source 28 are mismatched in DC voltage value, the communications circuitry 330 can adjust the current drawn from each power source 26, 28 to correct an imbalance with respect to the DC path resistance. For example, the communications circuitry 330 can be automatically activated to adjust the current drawn from each power source 26, 28 to keep the current within the required tolerance. The communications circuitry 330 can therefore be utilized to limit or avoid having a false power shutdown from either power source 26 or 28 induced by the false over-current condition resulting from either a mismatch in voltage or a pair-pair DC path-resistance mismatch.

In one arrangement, the powered device 16 can also include a first isolation device 332 and a second isolation device 334, such as an opto-isolator or transformer. The first isolation device 332 is electrically coupled to an output of the secondary windings 306 and form a feedback loop between the secondary 306 and the communication circuitry 330. The first isolation device 332, in conjunction with the transformer 300, helps to maintain an electrical isolation between the first and second power sources 12, 14. The second isolation device 334 electrically couples to the communication circuitry 330 and to the first and second controllers 312, 320. The second isolation device 334 isolates communications between the first and second controllers 312, 320 to maintain electrical isolation of the first and second power sources 12, 14, as the power sources 12, 14 may not have a common ground reference.

Figure 4A:
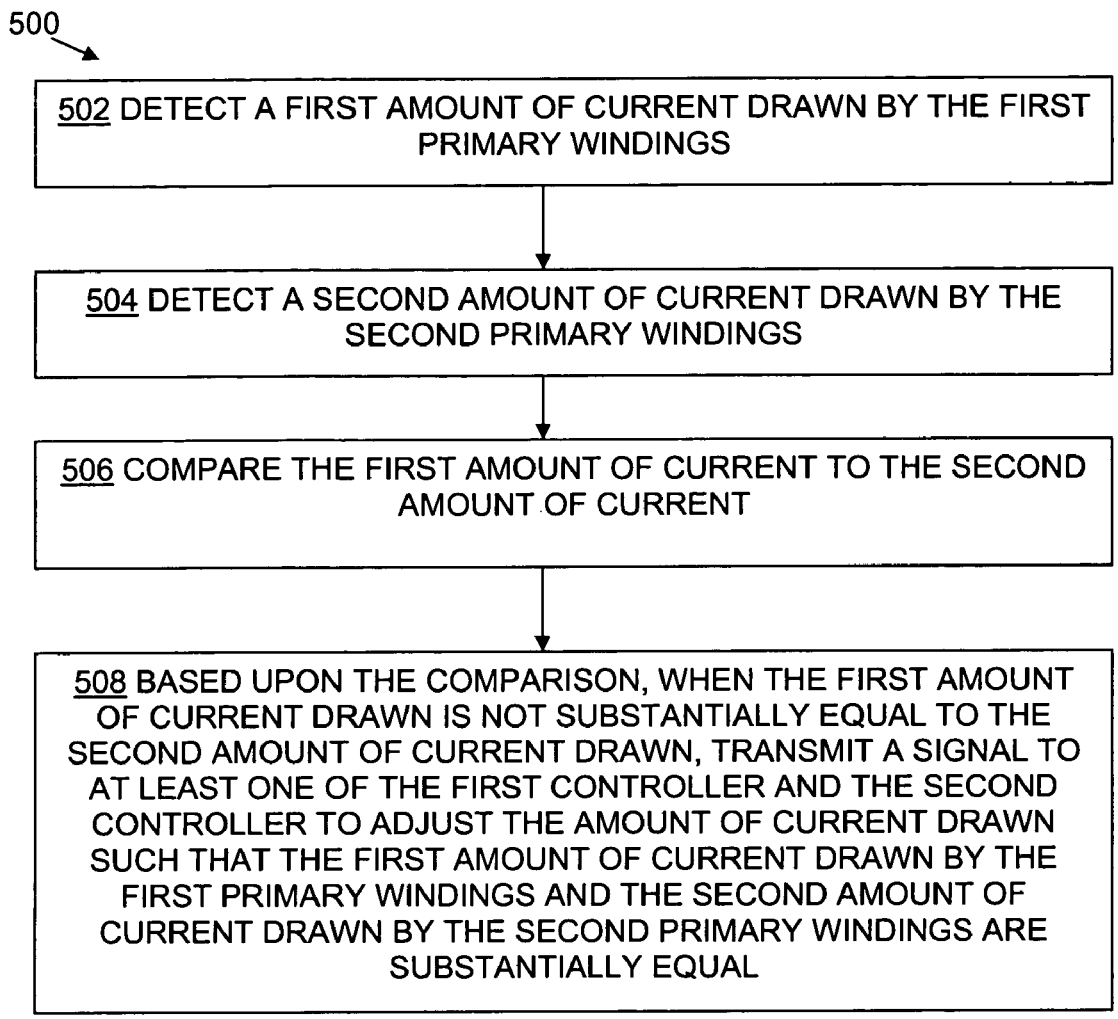
FIG. 4A is a flowchart that illustrates a procedure performed by communications circuitry associated with the data communications network of FIG. 2, according to one embodiment of the invention.

As indicated above, the communications circuitry 330 is configured to monitor the current drawn by the first and second primary windings 302, 304 and adjust the current drawn from each set of windings 302, 304 to ensure that the current drawn from each of the first and second power sources 12, 14 are within a particular tolerance. FIG. 4A is a flowchart 500 that illustrates such a procedure performed by the communications circuitry 330.

In step 502, the communications circuitry 330 detects a first amount of current drawn by the first primary windings 302. For example, assume the first controller 312 monitors the first amount of current drawn by the first primary windings 302 and stores the value in an associated memory location. In such a case, the communications circuitry 330 exchanges communications with the first controller 312 to retrieve the first current value.

In step 504, the communications circuitry 330 detects a second amount of current drawn by the second primary windings 304. For example, assume the second controller 320 monitors the second amount of current drawn by the second primary windings 304 and stores the value in an associated memory location. In such a case, the communications circuitry 330 exchanges communications with the second controller 320 to retrieve the second current value.

In step 506, the communications circuitry 330 compares the first amount of current to the second amount of current.

For example, the communications circuitry 330 performs a computation of the first and second current values to form a mathematical relationship between the two values.

In step 508, based upon the comparison, when the first amount of current drawn is not substantially equal to the second amount of current drawn, the communications circuitry 330 transmits a signal to at least one of the first controller 312 and the second controller 320 to adjust the amount of current drawn such that the first amount of current drawn by the first primary windings 312 and the second amount of current drawn by the second primary windings 320 are substantially equal. For example, assume that based upon the mathematical relationship between the first and second current values, the communications controller 330 detects that the first primary windings 302 draws a current that is greater than the current drawn by the second primary windings 304. In such a case, the communications circuitry 330 can transmit a signal to the first controller 312 thereby causing the first controller to reduce the amount of current drawn by the first primary windings 302. Alternately, the communications circuitry 330 can transmit a signal to the second controller 320 to cause the second controller 320 to increase the amount of current drawn by the second primary windings 304. As such the communications circuitry 330 can adjust the current drawn from each of the sets of windings 302, 304 to account for imbalances in the DC path resistances between the first and second sets of twisted pair conductors 18-1, 18-2 or between the third and fourth sets of twisted pair conductors 20-1, 20-2.

The equivalence of the current drawn by the first primary windings 312 and the second primary windings 320 is determined by the requirements of the system 10. In one arrangement, as indicated above, during power delivery to the powered device 16, there may be a mismatch in the DC resistance of the sets of twisted pair conductors 18, 20 that, in turn, may cause an imbalance of current to flow between one set of pairs versus the other. If the imbalance were to become high enough, the imbalance may cause a current limit on one set of pairs to inadvertently shut down the port power of the power source 16. Based upon the configuration of the system 10, the amount of current drawn by the first primary windings 312 and the second primary windings 320 can be unequal but considered "equivalent" to the degree that any discrepancy or difference between the current drawn by the first primary windings 312 and the second primary windings 320 does not cause the power source 16 to shut down port power. For example, assume the first primary windings 312 draws a current of 150 mA and the second primary windings 320 draws a current of 100 mA. In the current arrangement, while the amounts of current drawn are unequal, the amounts drawn can be considered equivalent if the discrepancy between the amounts drawn do not cause the powered device 16 to shut down port power.

Figure 4B:
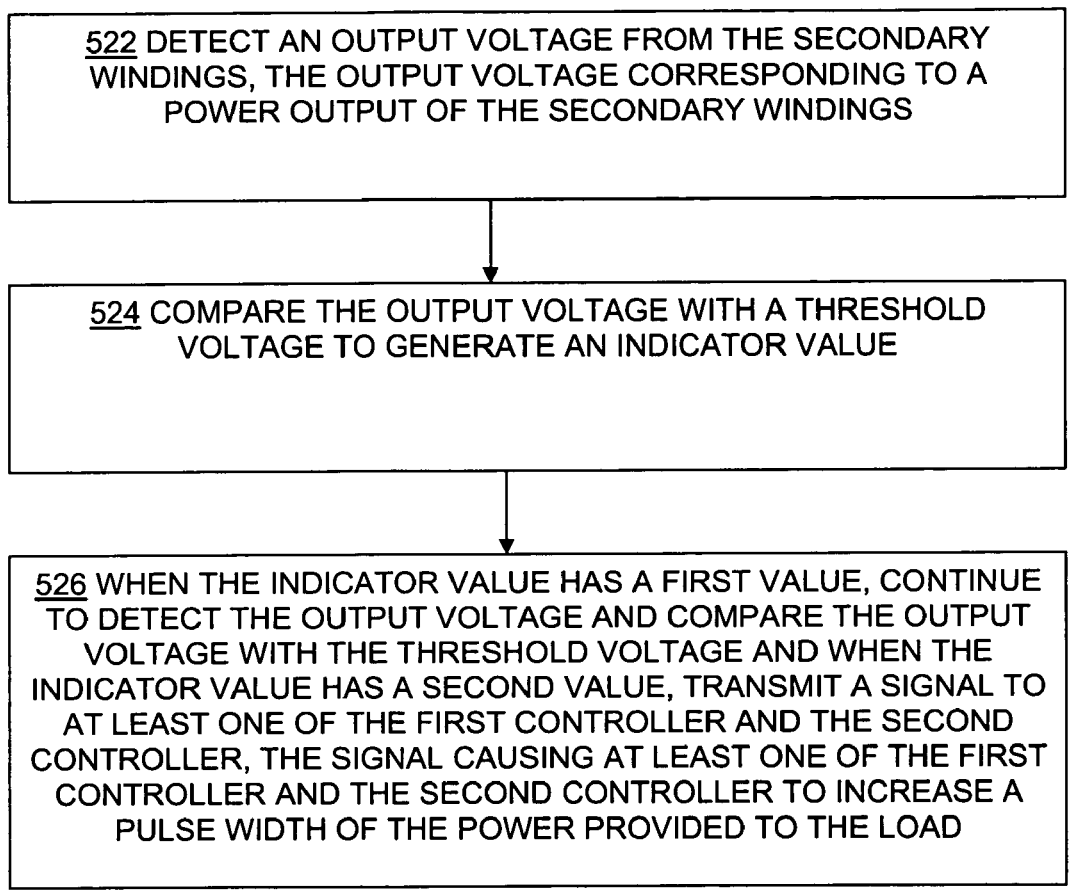
FIG. 4B is a flowchart that illustrates a procedure performed by communications circuitry associated with the data communications network of FIG. 2, according to another embodiment of the invention.

As indicated above, the communications circuitry 330 can monitor and adjust the current drawn by the first and second primary sets of windings 312, 320 to account for mismatched DC path resistances in the cables 18, 20. In one arrangement, the communications circuitry 330, in conjunction with the opto-isolator 332, can also monitor an output voltage from the secondary windings 306. The opto-isolator 332 is configured to regulate the output voltage from the secondary windings 306 to a set value. When the communications circuitry 330 detects a variation in the output voltage, such variation can be indicative of a change in the amount of power provided to the secondary windings 306. Therefore, by monitoring the voltage output for changes, the communications circuitry 330 can adjust an amount of power provided by the first and second primary sets of windings 302, 306 to the secondary set 306 to ensure that the load 24 receives an adequate amount of power for operation. FIG. 4B is a flowchart 520 that illustrates such a procedure performed by the communications circuitry 330.

In step 522, the communications circuitry 330 detects an output voltage from the secondary windings 306 where the output voltage corresponds to a power output of the secondary windings 306. For example, as illustrated in FIG. 2, the opto-isolator 332 is electrically coupled to the output of the secondary windings 306 and forms a feedback loop with the communication circuitry 330. In one arrangement, the amount of power delivered by the secondary windings 306 to the load 24 can affect the voltage output of the opto-isolator 332. Therefore, in order to effectively monitor the power output of the secondary 306, the communications circuitry 330 can monitor voltage output from the opto-isolator 332.

In step 524, the communications circuitry 330 compares the output voltage with a threshold voltage to generate an indicator value. For example, the threshold value can be preset to a voltage that corresponds to a minimal amount of power provided by the secondary windings 306 to the load 24 that allows the load 24 to operate.

In step 526, when the indicator value has a first value, such as a value that is greater than the threshold value, thereby indicating that the power provided to the load 24 is within an operational range, the communications circuitry 330 continues to detect the output voltage and compare the output voltage with the threshold voltage. However, when the indicator value has a second value, such as a value that is less than the threshold value, thereby indicating that the power provided to the load 24 is outside an operational range, the communications circuitry 330 transmits a signal to at least one of the first controller 312 and the second controller 320 signal causing at least one of the first controller 312 and the second controller 320 to increase a pulse width of the power provided to the load. For example, in the case where the output voltage from the opto-isolator 332 begins to decline, the signal sent by the communications circuitry 330 to the first and second controllers 312, 320 can cause the controllers 312, 320 to modulate a pulse width of the power pulses transmitted to the secondary windings 306 in order to increase both the power provided by the secondary windings 306 to the load 24 and the output voltage of the opto-isolator 332.

Figure 5:
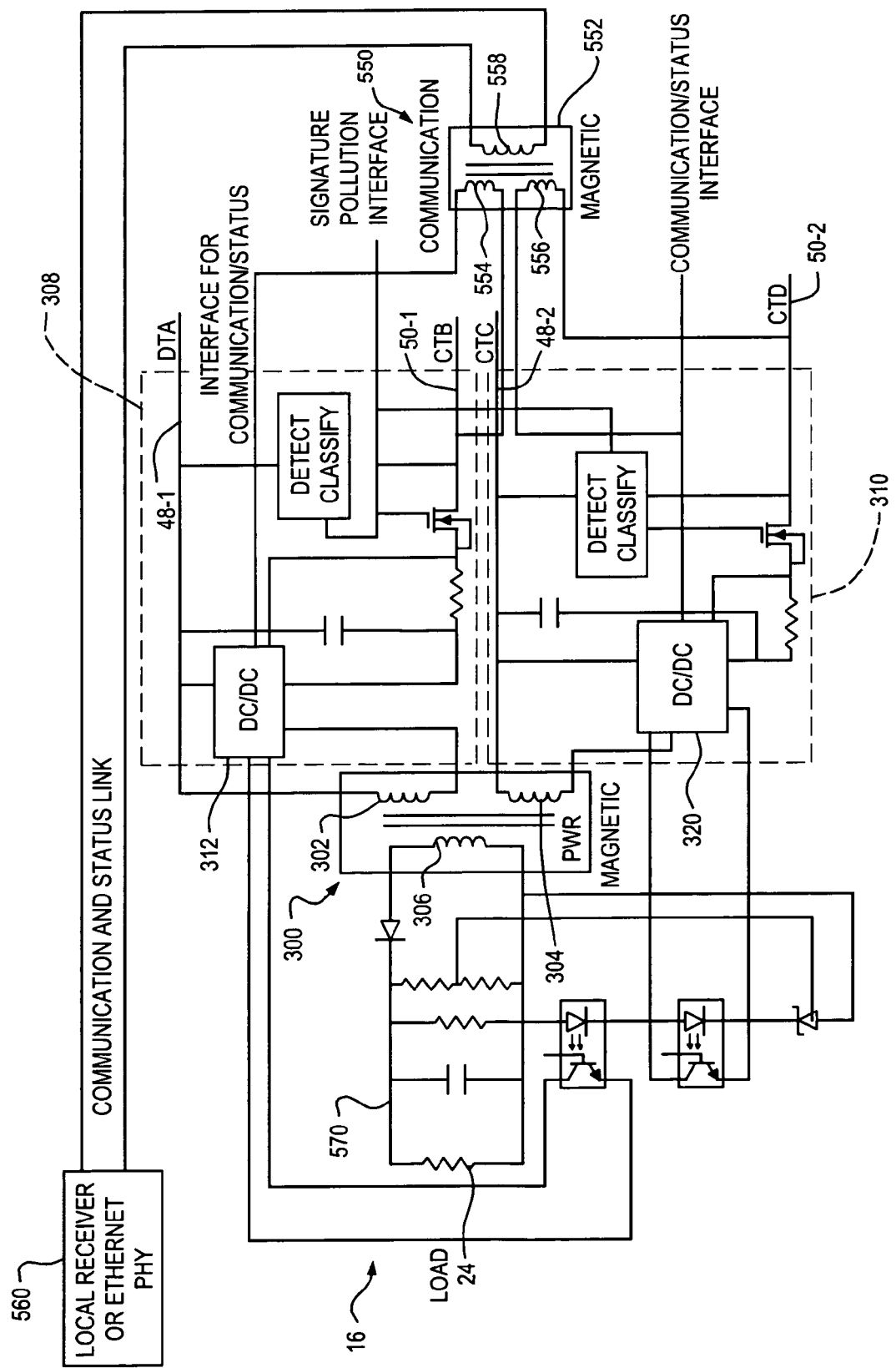
FIG. 5 illustrates a schematic diagram of the data communications network of FIG. 1, according to another embodiment of the invention.

As indicated above with respect to FIG. 2, the powered device 16 can receive power from the first power source 12 or the second power source 14 via 2-pair powering or from a combination of both the first power source 14 and second power source 16 via 4-pair powering. In one arrangement, as illustrated in FIG. 5, in order to configure the powered device 16 to receive power using either the 2-pair mode or 4-pair mode, the power converter electronics 22 are operable to detect whether power is provided to the powered device 16 by either the first powered device (e.g., 2-pair mode), the second powered device (e.g., 2-pair mode), or both the first and second powered devices (e.g., 4-pair mode). It should be noted that the embodiment shown in FIG. 5 is a mirror image of that shown in FIG. 2 with the load 24 located on the left-hand side of the page.

In FIG. 5, the powered device 16 includes a power detector 550 operable to detect whether power is provided to the powered device 16 from a first power source 12 over a first cable having two sets of twisted pair conductors 18, from a second power source 14 over by a second cable 20 having two sets of twisted pair conductors, or from the first and second power sources over both the first twisted pair cable 18 and the second twisted pair cable 20.

While the power detector 550 can be configured in a variety of ways, in one arrangement the power detector is configured as an isolated communication interface, such as a communications transformer 552 having first primary detector windings 554 electrically coupled to the first controller 312, second primary detector windings 556 electrically coupled to the second controller 320, and secondary detector windings 558 electrically coupled to the first primary detector windings 554, to the second detector windings 556, and to a signal output 560, such as a local signal receiver, an Ethernet physical layer device, and a local processor configured to detect the status, manage, and control the primary side electronics of 312 and 320 and to generate and manage load-side power.

The first primary detector windings 554 are configured to detect a transfer of power between the first primary windings 302 and the secondary windings 306 of the transformer 300. For example, in the case where the first power source 12 provides power to the powered device 16 via center taps 48-1, 50-1, the first primary windings 302 build-up an amount of power. In the case where the first controller 312 causes the first primary windings 302 to transmit a power pulse to the secondary windings 306, the first controller transmits a signal to the first primary detector windings 554, thereby allowing the first primary detector windings 554 to effectively detect the transfer of power between the first primary windings 302 and the secondary windings 306 and indicating that the powered device 16 received power from the corresponding first power source 12. In response to such detection, the first primary detector windings 554 generates a reporting signal, such as an electromagnetic pulse, indicating the transfer of power between the first primary windings 302 and the secondary windings 306 and transmits the signal to the secondary detector windings 558.

The second primary detector windings 556 are configured to detect a transfer of power between the second primary windings 304 and the secondary windings 306. For example, in the case where the second power source 14 provides power to the powered device 16 via center taps 48-2, 50-2, the second primary windings 304 build-up an amount of power. In the case where the second controller 312 causes the second primary windings 304 to transmit a power pulse to the secondary windings 306, the second controller 320 transmits a signal to the second primary detector windings 556, thereby allowing the second primary detector windings 556 to effectively detect the transfer of power between the first primary windings 302 and the secondary windings 306 and indicating that the powered device 16 received power from the corresponding second power source 14. In response to such detection, the second primary detector windings 556 generates a reporting signal, such as an electromagnetic pulse, indicating the transfer of power between the second primary windings 304 and the secondary windings 306 and transmits the signal to the secondary detector windings 558.

When the secondary detector windings 558 receives the reporting signal from one or both of the sets of detector windings 554, 556, the secondary detector windings 558 transmits the reporting signal to the signal output 560 to provide a report as to the whether the powered device is being powered in 2-pair mode or 4-pair mode. For example, when the secondary detector windings 558 receives a reporting signal from either of the detector windings 554, 556, the reporting signal indicates that the powered device 16 receives power in 2-pair mode. When the secondary detector windings 558 receives a reporting signal from both of the detector windings 554, 556, the reporting signal indicates that the powered device 16 receives power in 4-pair mode.

As indicated in the arrangement above, the power converter electronics 22 are operable to detect whether power is provided to the powered device 16 by either the first powered device (e.g., 2-pair mode), the second powered device (e.g., 2-pair mode), or both the first and second powered devices (e.g., 4-pair mode) using the power detector 550. In another arrangement, the load 24 is configured to detect whether power is provided to the powered device 16 via 2-pair or 4-pair mode. For example, upon initialization of the powered device 16, the load 24 does not draw a maximum amount of power provided to the powered device 16 but instead powers below the maximum amount (e.g., 15 W). To detect whether the load 24 receives power via 2-pair or 4-pair mode, the load 24 measures the frequency of the power signal along a diode-side 570 of the load 24. In the case where the powered device 16 receives power via 4-pair mode, the load 24 detects the power signal as having a frequency of X Hz. In the case where the powered from device 16 receives power via 2-pair mode, the load 24 detect the power signal as having a frequency of X/2 Hz (e.g., the frequency of the power signal in 2-pair mode is half the frequency of the signal in 4-pair mode). As a result of measuring the frequency of the signal on the diode-side 570, the load 24 can detect operation of the powered device 16 via 2-pair or 4-pair mode.

While this invention has been particularly shown and described with references to preferred embodiments thereof, it will be understood by those skilled in the art that various changes in form and details may be made therein without departing from the spirit and scope of the invention as defined by the appended claims.

While the power detector 550 is illustrated as a magnetic communications transformer 552, such illustration is by way of example only. In one arrangement, the power detector 550 can be configured as one or more opto-isolators, high voltage capacitors, or a combination of both. For example, the opto-isolator 332 shown in FIG. 2 can be used to impose higher speed signals for purposes of providing communication and feedback data to the first and second controllers 312, 320 for their use. In another arrangement, a low-pass filter can be utilized to isolate the feedback signal from such communication (e.g., in this case the 'data' is sent from the load side where the load 24 is located to the primary side where the controllers 312, 320 are located).

The isolated communication interface 550 can also be configured to perform other functions, such as involving an exchange of status and power information (current and voltage DC and AC) from the first and second primary detector windings 554, 556 (e.g., the primary side) where the 48V electronics and DC/DC circuitry are located opposite to the secondary detector windings 558 (e.g., the load side). When the information is transmitted back to the first and/or second power sources 12, 14 from the signal output 560 (e.g., Ethernet physical layer device) as data packets, the transmission enables a feedback path between the first and/or second power sources 12, 14 and the powered device 16. The powered device 16 in turn, can exchange such information with the PSE sources 26 and 28 as shown in FIG. 1 using common mode communication means, or execute such exchange using the data traffic such as packet-like or Ethernet compliant packets (e.g., AC differential signals carried through magnetic devices 30, 32 and the physical layer (PHY) integrated circuits). The feedback path allows a variety of information exchanges to take place between the first and/or second power sources 12, 14 and the powered device 16 that has applications in power allocation, security, management, and control.

Figure 6:
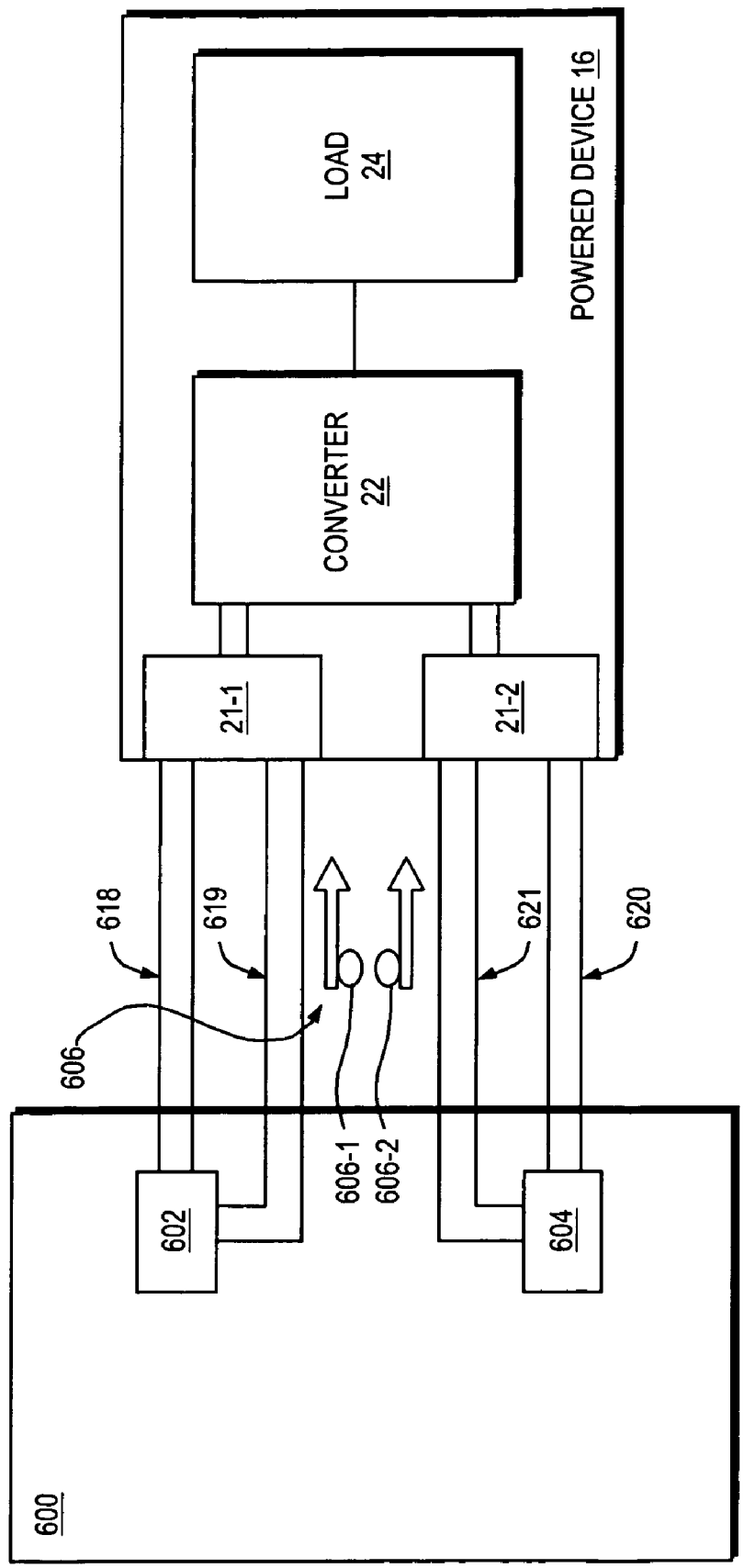
FIG. 6 illustrates a block diagram of a data communications network, according to another embodiment of the invention.

As indicated with respect to FIG. 1, the powered device 16 is configured to receive power from a first power source 12, such as a PoE device or power sourcing equipment using two sets of twisted-pair conductors 18, and from a second power source 14, such as a midspan device, also using two sets of twisted-pair conductors 20. Such description is by way of example only. In one arrangement, as illustrated in FIG. 6, the powered device 16 electrically couples to a single power source device 600 via four sets of twisted pair conductors 618, 619, 620, 621.

In one arrangement, the power source device 600 can discover the presence of the powered device 16 prior to applying power to the powered device 16. For example, the power source device 600 (e.g., a logic circuit associated with the power source device) is configured to verify connection of the power source device 600 to the powered device 16 by four sets of twisted pair connectors 618, 619, 620, and 621. Such detection ensures that the sets of twisted pairs of conductors 618, 619, 620, 621 have not been split or connected to more than one powered device 16. For example, the power source 600 includes a first power source controller 602 electrically coupled to the first interface electronics 21-1 via twisted pair connectors 618, 619 and includes a second power source controller 604 electrically coupled to the second interface electronics 21-2 via twisted pair connectors 620, 621. In use, the power source device 600 transmits a classification signal 606 (e.g., such as defined in the 802.3af or similar standards) to the powered device 16 where the classification signal 606 is operable to verify connection of the power source device 600 to the powered device 16 via all four sets of twisted pair conductors (e.g., by a first cable having two sets of twisted pair conductors 618, 619 configured to carry power between the power source device 600 and the powered device 16 and by a second cable having two sets of twisted pair conductors 620, 621 configured to carry power between the power source device 600 and the powered device 16).

For example, the first and second power source controllers 602, 604 transmit respective signals 606-1, 606-2 to the powered device 16 over the pairs of conductors 618, 619, 620, and 621 to detect a signature, such as a 25 k-ohm signature, on the first set of pairs of conductors 618, 619 and on the second set of pairs of conductors 620, 621. If the signature of the first set of pairs of conductors 618, 619 is substantially equal to the signature of the second set of pairs of conductors 620, 621, one of the first or second power source controllers 602, 604 transmits a voltage signal (e.g., within the detection or classification range such as defined in the IEEE 802.3af standard) on its corresponding pair of conductors (e.g., pairs 618, 619 or 620, 621). For example, assume the first power source controller 602 transmits the voltage signal to the powered device 16 using the first set of pairs of conductors 618, 619. In the case where all four sets of twisted pair conductors 618, 619, 620, and 621 terminate in the same powered device 16, the voltage signal transmitted by the first power source controller 602 causes the signature on the second set of pairs of conductors 620, 621 to become polluted (e.g., go out of range relative to the 25k-ohm signature). The polluted 25-k signature is then detected by a logic circuit associated with the first set of pairs of conductors 618, 619 and is taken as an indication that all four pairs of conductors 618, 619, 620, and 621 terminate in the same powered device 16. While an example is described here, multiple schemes can be devised to insure proper detection before power is applied.

With reference to FIG. 1, the power converter electronics 22 can have circuit elements that enable the power sources 12 and 14 to discover the presence of the power converter electronics 22 before supplying power thereto. Such circuit elements, can be configured to meet standard requirements such those of 802.3af or any future standards. In an alternate embodiment, the power sources 12 and 14 are configured to discover presence of the power converter electronics 22 via other discovery processes, such as by data or differential signaling.

FIG. 3 shows several charts 400 that illustrate an example of the alternating nature of the power delivery performed by the transformer 300 operating at a 500 kHz frequency (e.g., where the period is 2 uS) and a 25% duty. As indicated, the first primary windings 302 transfers 15 W of power to the secondary windings 306 during the first half of the cycle and the second primary windings 304 transfers 15 W of power to the secondary set of windings 306 during the second half of the cycle. In such an arrangement, the average power provided by each of the windings 302, 304 for each duty cycle is 3.75 W and the total power received by the secondary windings 306 is 7.5 W. In another arrangement, in order to provide the secondary set of windings 306 with a total of 30 W, the first primary windings 302 are configured to transfer 60 W of power to the secondary windings 306 during the first half of the cycle and the second primary windings 304 transfers 60 W of power to the secondary windings 306 during the second half of the cycle.

Also, as indicated with respect to FIG. 4A, the communications circuitry 330 is configured to monitor the current drawn by the first and second primary winding 302, 304 and adjust the current drawn from each set of windings 302, 304 to ensure that the current drawn from each of the first and second power sources 12, 14 are within a particular tolerance. In an alternate embodiment, the communications circuitry 330 is configured to measure the input voltages as provided by the first and second power sources 12, 14 to the first and second primary winding 302, 304. Based upon the measured voltages, the communications circuitry 330 can calculate the amount of current provided to each set of windings 302, 304 (e.g. based upon P=I*V). As a result of the calculation, the communications circuitry 330 can set the amount of current to provide substantially equal power between both the first and second primary winding 302, 304.

What is claimed is:

1. A powered device operable to receive power via a communication medium, the powered device comprising:
   first interface electronics operable to receive power from a first power source by a first two sets of twisted pair conductors and second interface electronics operable to receive power from a second power source by a second two sets of twisted pair conductors;
   power converter electronics having:
      first primary windings electrically coupled to the first interface electronics,
      second primary windings electrically coupled to the second interface electronics, and
      secondary windings electrically coupled to the first primary windings and to the second primary windings; and
   a load electrically coupled to the secondary windings, the power converter electronics being operable to provide power to the load from one of (i) the first interface electronics and the first two sets of twisted pair conductors, (ii) the second interface electronics and the second two sets of twisted pair conductors, and (iii) both the first interface electronics and the first two sets of twisted pair conductors and the second interface electronics and the second two sets of twisted pair conductors;
   the power converter electronics further comprises:
   a first controller electrically coupled to the first primary windings, the first controller configured to control power delivery to the secondary windings via the first primary windings; and
   a second controller electrically coupled to the second primary windings, the second controller configured to control power delivery to the secondary windings via the second primary windings; and
   further comprising a communications circuit electrically coupled to the first controller and the second controller, the communications circuit configured to:
   detect a first amount of current drawn by the first primary windings;
   detect a second amount of current drawn by the second primary windings;
   compare the first amount of current to the second amount of current; and
   based upon the comparison, when the first amount of current drawn is not substantially equal to the second amount of current drawn, transmit a signal to at least one of the first controller and the second controller to adjust an amount of current drawn such that the first amount of current drawn by the first primary windings and the second amount of current drawn by the second primary windings are substantially equal;

a power detector operable to detect whether power is provided by a first of two sets of twisted pair conductors, by a second of two sets of twisted pair conductors, or from both the first of two sets of twisted pair conductors and the second of two sets of twisted pair conductors;

wherein the power detector comprises:

first primary detector windings electrically coupled to the first primary windings and operable to detect a transfer of power between the first primary windings and the secondary windings and in response to detecting a transfer of power, generate a reporting signal indicating the transfer of power between the first primary windings and the secondary windings;

second primary detector windings electrically coupled to the second primary windings and operable to detect a transfer of power between the second primary windings and the secondary windings and in response to detecting a transfer of power, generate a reporting signal indicating the transfer of power between the second primary windings and the secondary windings; and secondary detector windings electrically coupled to the first primary detector windings and to the second primary detector windings and electrically coupled to a signal output, the secondary detector windings configured to receive the reporting signal from at least one of the first primary set of detector windings and the second primary set of detector windings and transmit the reporting signal to the signal output.

2. In a powered device, a method for providing power to a powered device load, comprising:

electrically coupling first interface electronics to a first power source by a first two sets of twisted pair conductors, the first interface electronics electrically coupled to first primary windings and secondary windings;

electrically coupling second interface electronics to a second power source by a second two sets of twisted pair conductors, the second interface electronics electrically coupled to second primary windings and the secondary windings;

providing power to the powered device load electrically coupled to the secondary windings from one of (i) the first interface electronics and the first two sets of twisted pair conductors, (ii) the second interface electronics and the second two sets of twisted pair conductors, and (iii) both the first interface electronics and the first two sets of twisted pair conductors and the second interface electronics and the second two sets of twisted pair conductors;

controlling power delivery to the secondary windings via the first primary windings by a first controller electrically coupled to the first primary windings;

controlling power delivery to the secondary windings via the second primary windings by a second controller electrically coupled to the second primary windings;

detecting, by a communications circuit electrically coupled to the first controller a first amount of current drawn by the first primary windings to the secondary windings;

detecting, by the communications circuit electrically coupled to the second controller, a second amount of current drawn by the second primary windings to the secondary windings;

comparing, by the communications circuit, the first amount of current drawn to the second amount of current drawn; and based upon the comparison, when the first amount of power is not substantially equal to the second amount of power, transmitting a signal to at least one of the first controller and the second controller to adjust the amount of current drawn such that the first amount of current drawn by the first primary windings to the secondary windings and the second amount of current drawn by the second primary windings are substantially equal;

comprising detecting, by a power detector, a connection condition associated with the powered device, the connection condition indicating one of the power being provided by a first two sets of twisted pair conductors, the power being provided by a second two sets of twisted pair conductors, or the power being provided from both the first two sets of twisted pair conductors and the second two sets of twisted pair conductors;

detecting, by first primary detector windings electrically coupled to the first primary windings, a transfer of power between the first primary windings and the secondary windings and in response to detecting a transfer of power, generate a reporting signal indicating the transfer of power between the first primary windings and the secondary windings;

detecting, by second primary detector windings electrically coupled to the second primary windings, a transfer of power between the second primary windings and the secondary windings and in response to detecting a transfer of power, generate a reporting signal indicating the transfer of power between the second primary windings and the secondary windings; and receiving, by secondary detector windings electrically coupled to the first primary set of detector windings and to the second primary set of detector windings and electrically coupled to a signal output, the reporting signal from at least one of the first primary set of detector windings and the second primary set of detector windings and transmitting the reporting signal to the signal output.

3. A powered device operable to receive power via a communication medium, the powered device comprising:

first interface electronics operable to receive power from a first power source by a first two sets of twisted pair conductors and second interface electronics operable to receive power from a second power source by a second two sets of twisted pair conductors;

power converter electronics having:

first primary windings electrically coupled to the first interface electronics, second primary windings electrically coupled to the second interface electronics, and secondary windings electrically coupled to the first primary windings and to the second primary windings;

a load electrically coupled to the secondary windings, the power converter electronics being operable to provide power to the load from both the first interface electronics and the first two sets of twisted pair conductors and the second interface electronics and the second two sets of twisted pair conductors; and a logic circuit configured to:

detect a first amount of current drawn by the first primary windings;

detect a second amount of current drawn by the second primary windings;

compare the first amount of current to the second amount of current; and based upon the comparison, when the first amount of current drawn is not substantially equal to the second amount of current drawn, adjust the amount of current drawn such that the first amount of current drawn by the first primary windings and the second amount of current drawn by the second primary windings are substantially equal;

a power detector operable to detect whether power is provided by a first of two sets of twisted pair conductors, by a second of two sets of twisted pair conductors, or from both the first of two sets of twisted pair conductors and the second of two sets of twisted pair conductors;

wherein the power detector comprises:

first primary detector windings electrically coupled to the first primary windings and operable to detect a transfer of power between the first primary windings and the secondary windings and in response to detecting a transfer of power, generate a reporting signal indicating the transfer of power between the first primary windings and the secondary windings;

second primary detector windings electrically coupled to the second primary windings and operable to detect a transfer of power between the second primary windings and the secondary windings and in response to detecting a transfer of power, generate a reporting signal indicating the transfer of power between the second primary windings and the secondary windings; and secondary detector windings electrically coupled to the first primary detector windings and to the second primary detector windings and electrically coupled to a signal output, the secondary detector windings configured to receive the reporting signal from at least one of the first primary set of detector windings and the second primary set of detector windings and transmit the reporting signal to the signal output.

4. A powered device operable to receive power via a communication medium, the powered device comprising:

first interface electronics operable to receive power from a first power source by a first two sets of twisted pair conductors and second interface electronics operable to receive power from a second power source by a second two sets of twisted pair conductors;

power converter electronics having:
first primary windings electrically coupled to the first interface electronics,
second primary windings electrically coupled to the second interface electronics, and
secondary windings electrically coupled to the first primary windings and to the second primary windings;

a load electrically coupled to the secondary windings, the power converter electronics being operable to provide power to the load from one of (i) the first interface electronics and the first two sets of twisted pair conductors, (ii) the second interface electronics and the second two sets of twisted pair conductors, and (iii) both the first interface electronics and the first two sets of twisted pair conductors and the second interface electronics and the second two sets of twisted pair conductors;

a power detector operable to detect whether power is provided by a first of two sets of twisted pair conductors, by a second of two sets of twisted pair conductors, or from both the first of two sets of twisted pair conductors and the second of two sets of twisted pair conductors; and the power detector comprising:

first primary detector windings electrically coupled to the first primary windings and operable to detect a transfer of power between the first primary windings and the secondary windings and in response to detecting a transfer of power, generate a reporting signal indicating the transfer of power between the first primary windings and the secondary windings;

second primary detector windings electrically coupled to the second primary windings and operable to detect a transfer of power between the second primary windings and the secondary windings and in response to detecting a transfer of power, generate a reporting signal indicating the transfer of power between the second primary windings and the secondary windings; and secondary detector windings electrically coupled to the first primary detector windings and to the second primary detector windings and electrically coupled to a signal output, the secondary detector windings configured to receive the reporting signal from at least one of the first primary set of detector windings and the second primary set of detector windings and transmit the reporting signal to the signal output.

5. The powered device of claim 4, further comprising:

a capacitor electrically coupled to the first interface electronics and disposed between a first set of the two sets of twisted pair conductors and a second set of the two sets of twisted pair conductors; and a capacitor electrically coupled to the second interface electronics and disposed between a first set of the two sets of twisted pair conductors and a second set of the two sets of twisted pair conductors.

6. The powered device of claim 4, wherein the communications circuit is further in electrical communication with the secondary windings, the communications circuit configured to:

detect an output voltage from the secondary windings, the output voltage corresponding to a power output of the secondary windings;

compare the output voltage with a threshold voltage to generate an indicator value; and (i) when the indicator value has a first value, continue to detect the output voltage and compare the output voltage with the threshold voltage and (ii) when the indicator value has a second value, transmit a signal to at least one of the first controller and the second controller, the signal causing at least one of the first controller and the second controller to increase a pulse width of the power provided to the load.

7. The powered device of claim 6, comprising an opto-isolator electrically coupled to the secondary windings and disposed between the secondary windings and the communications circuit.

8. The powered device of claim 4, wherein:

the first interface electronics are operable to receive power from the first power source where the first power source is a first power source controller of a power source device and the second interface electronics are operable to receive power from the second power source where the second power source is a second power source controller of the power source device; and the powered device is operable to receive a classification signal from the power source device, the classification signal operable to verify connection of the power source device to the powered device by the first two sets of twisted pair conductors configured to carry power between the power source device and the powered device and by the second two sets of twisted pair conductors configured to carry power between the power source device and the powered device.

9. The powered device of claim 4, wherein the power converter electronics are operable to provide power to the load from the first power source, the second power source, or both the first power source and second power source.

10. The powered device of claim 4, wherein the power converter electronics are operable to provide greater than about 12 W of power to the load.

11. The powered device of claim 4, wherein the powered device is configured as an Internet Protocol (IP) telephone.

12. In a powered device, a method for providing power to a powered device load, comprising:
electrically coupling first interface electronics to a first power source by a first two sets of twisted pair conductors, the first interface electronics electrically coupled to first primary windings and secondary windings;
electrically coupling second interface electronics to a second power source by a second two sets of twisted pair conductors, the second interface electronics electrically coupled to second primary windings and the secondary windings; and
providing power to the powered device load electrically coupled to the secondary windings from one of (i) the first interface electronics and the first two sets of twisted pair conductors, (ii) the second interface electronics and the second two sets of twisted pair conductors, and (iii) both the first interface electronics and the first two sets of twisted pair conductors and the second interface electronics and the second two sets of twisted pair conductors;
detecting, by a power detector, a connection condition associated with the powered device, the connection condition indicating one of the power being provided by a first two sets of twisted pair conductors, the power being provided by a second two sets of twisted pair conductors, or the power being provided from both the first two sets of twisted pair conductors and the second two sets of twisted pair conductors;
detecting, by first primary detector windings electrically coupled to the first primary windings, a transfer of power between the first primary windings and the secondary windings and in response to detecting a transfer of power, generate a reporting signal indicating the transfer of power between the first primary windings and the secondary windings;
detecting, by second primary detector windings electrically coupled to the second primary windings, a transfer of power between the second primary windings and the secondary windings and in response to detecting a transfer of power, generate a reporting signal indicating the transfer of power between the second primary windings and the secondary windings; and
receiving, by secondary detector windings electrically coupled to the first primary set of detector windings and to the second primary set of detector windings and electrically coupled to a signal output, the reporting signal from at least one of the first primary set of detector windings and the second primary set of detector windings and transmitting the reporting signal to the signal output.

13. The method of claim 12, wherein the communications circuit is in electrical communication with the secondary windings, the method further comprising:
detecting an output voltage from the secondary windings, the output voltage corresponding to a power output of the secondary windings;
comparing the output voltage with a threshold voltage to generate an indicator value; and
(i) when the indicator value has a first value, continuing to detect the output voltage and compare the output voltage with the threshold voltage and (ii) when the indicator value has a second value, transmitting a signal to at least one of the first controller and the second controller, the signal causing at least one of the first controller and the second controller to increase a pulse width of the power provided to the load.

14. The method of claim 13, wherein, wherein detecting comprises detecting the output voltage from an opto-isolator electrically coupled to the secondary windings and disposed between the secondary windings and the communications circuit.

15. The method of claim 12, comprising:
receiving, by the first interface electronics, power from the first power source where the first power source is a first power source controller of a power source device and the second interface electronics is operable to receive power from the second power source where the second power source is a second power source controller of the power source device; and
receiving, by the powered device, a classification signal from the power source device, the classification signal operable to verify connection of the power source device to the powered device by the first cable having two sets of twisted pair conductors configured to carry power between the power source device and the powered device and by the second cable having two sets of twisted pair conductors configured to carry power between the power source device and the powered device.

16. The method of claim 12, wherein providing comprises providing, by the power converter electronics, power to the load from one of the first power source, the second power source, and both the first power source and second power source.

* * * * *